July 22, 1958

W. F. ALLER 2,843,939

GAGING APPARATUS

Filed May 21, 1952

4 Sheets-Sheet 1

INVENTOR
Willis Fay Aller

BY *Donald E. Lane*

ATTORNEY

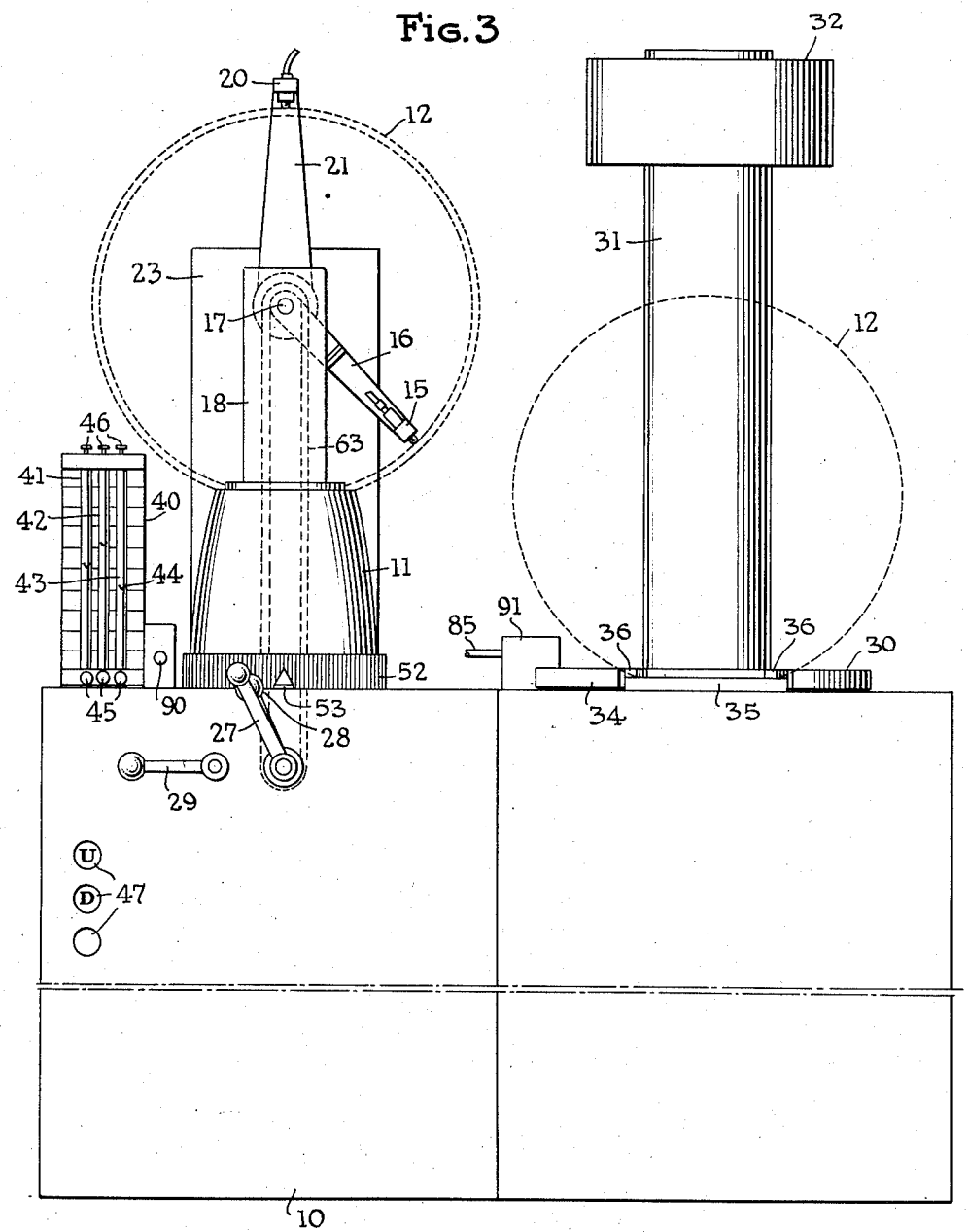

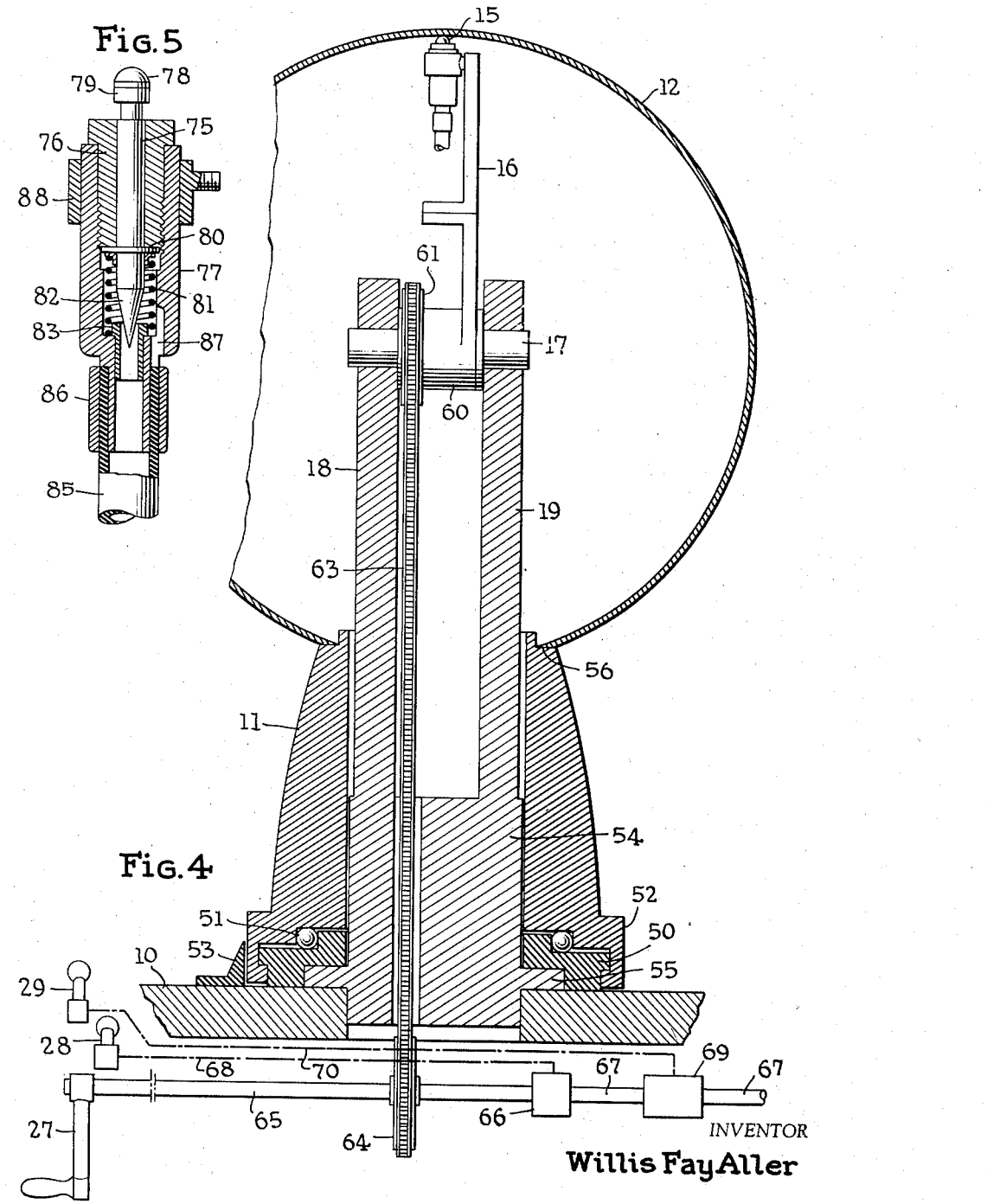

2,843,939

GAGING APPARATUS

Willis Fay Aller, Dayton, Ohio, assignor, by mesne assignments, to The Sheffield Corporation, a corporation of Delaware Application May 21, 1952, Serial No. 289,065

16 Claims. (Cl. 33—174)

This invention relates to gaging apparatus and more particularly to a novel gage for indicating variations in the wall thickness and in the radii of curved or spherical or partly spherical objects.

The accurate measurement of the wall thickness of container or the like of curved or spherical shape is of importance in determining the suitability of said container for use as a pressure vessel or for other uses. It is also of importance to accurately measure the inside radius and the outside radius of such containers to ascertain volumetric capacity, and also to locate any variations from regular curvature and from absolute spherical shape.

It is an object of this invention to provide gaging apparatus operable to accurately determine the wall thickness of objects of curved or spherical or partly spherical contour.

It is another object of this invention to provide gaging apparatus operable to accurately determine the inside and the outside radius of curvature of curved or spherical or partly spherical objects.

It is another object of this invention to provide gaging apparatus adapted to gage spherical objects without the use of inside and outside calipers or other manually supported measuring devices.

It is a still further object of this invention to provide a gaging device which may be easily operated to accurately measure and compare a series of curved or spherical objects for determining which objects comply with desired dimensional tolerances.

Figure 1:
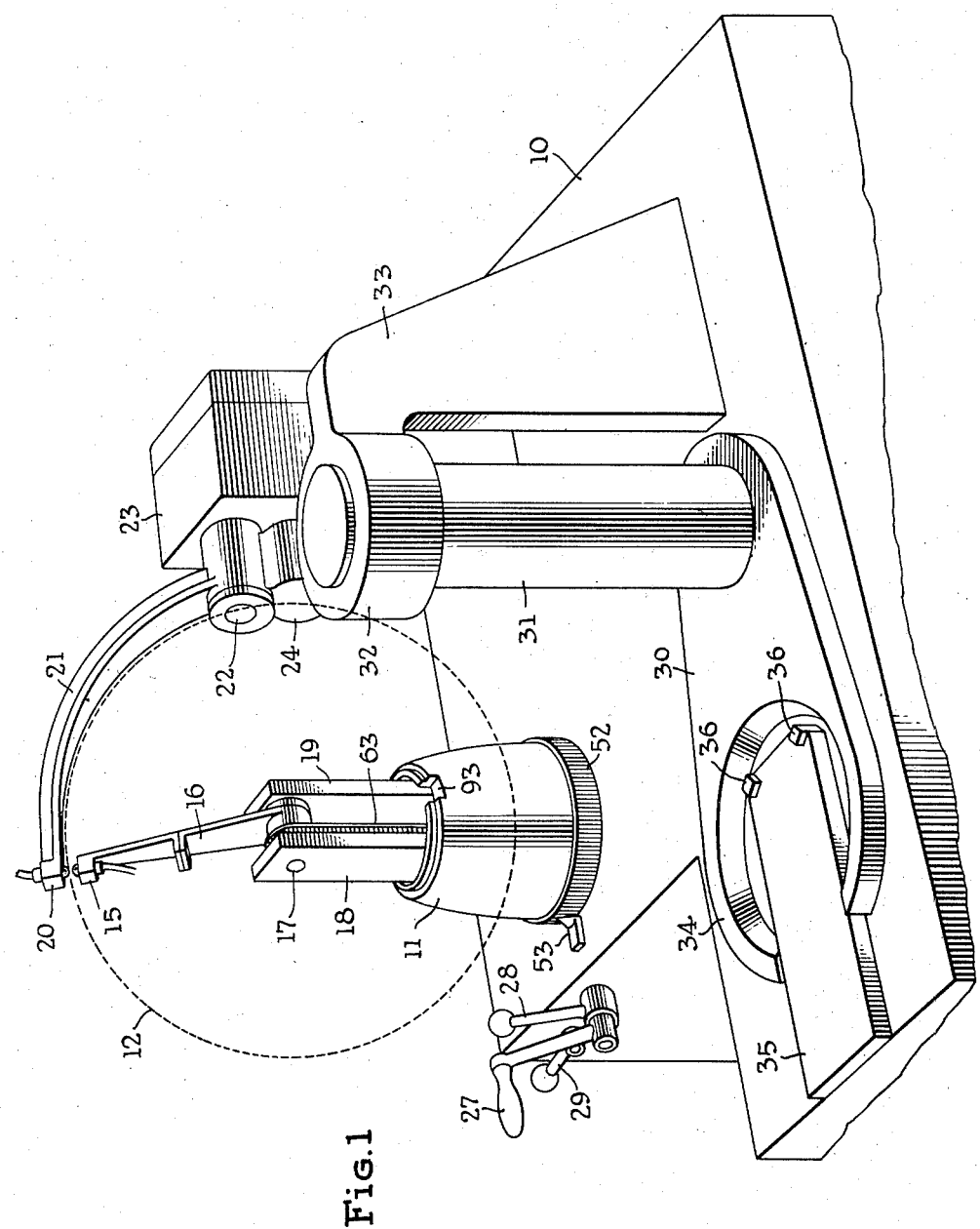
Figure 2:
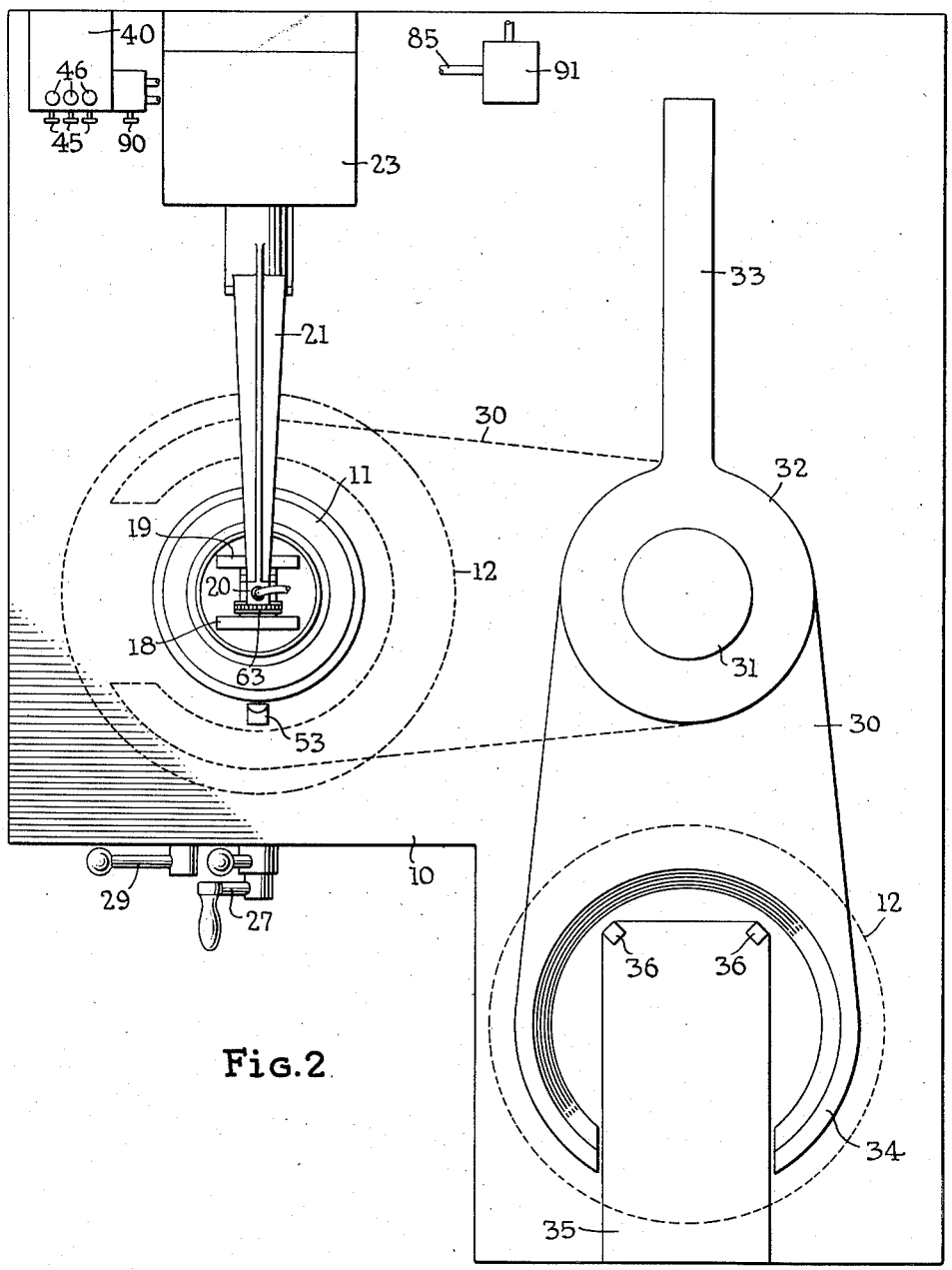

Other objects and advantages of this invention will be readily apparent to those skilled in the precision gaging art from examination of the following description of the preferred embodiment illustrated in the accompanying drawings wherein:

Figure 1 is a perspective view of gaging apparatus with a portion of the supporting base cut away, Figure 2 is a plan view of the apparatus illustrated in Figure 1, Figures 3 is a front elevational view of the apparatus shown in Figures 1 and 2, Figure 4 is an enlarged vertical elevation of the support and internal gaging device shown in the preceding figures, and Figure 5 is an enlarged sectional view of one of the feeler devices utilized in the gaging apparatus.

All of the figures of the drawings are somewhat diagrammatic in character, and minor details of means and methods for securing the elements together and for establishing mechanical drive connections are omitted for the sake of simplicity.

Referring to Figure 1 of the drawings, for the purposes of illustration, the base of the gaging apparatus is designated by the numeral 10. A sleeve or horn 11 for supporting the object to be gaged is mounted on the base 10 for rotary movement on a vertical axis. The gaging apparatus is illustrated in a form for gaging a spherical container or shell 12, the latter having a circular opening therein and adapted to rest on the upper end of horn 11 during the gaging operation. A feeler gage 15, preferably of the pneumatic type hereinafter described, is adjustably mounted in the outer end of swingable arm 16. The arm 16 is supported on a horizontal pin 17 mounted in supporting members 18 and 19 projecting upward from within the horn 11. The second or outer feeler gage 20 is adjustably mounted in the end of a curved arm 21, the arm 21 being journaled on a horizontal bearing pin 22 supported by a standard 23 secured to the base 10. The arm 21 is adapted to swing on the pin 22 and may be provided with a counterbalancing weight 24. Suitable controls, hereinafter described, are mounted on the front of the base 10, and include a crank 27 for swinging the arms 16 and 21 in unison on the supporting pins 17 and 22, said pins being axially aligned, and includes a lever 28 for disengaging the drive connection between arms 16 and 21, and a lever 29 for locking the arm 21 in a horizontal position.

Means for loading or placing the object 12 on the horn 11 are also supported on the base 10, and include a swinging shelf 30 secured to the vertical tube 31. The tube 31 is mounted for vertical movement with respect to base 10 and is supported at its upper end by a bearing 32 carried by a standard 33 secured to the base 10. The tube 31 is also adapted to swing on its vertical axis to allow the bifurcated end 34 of the shelf 30 to straddle the horn 11, as shown in dotted lines in Figure 2. An object-supporting plate 35 is mounted on the base 10 and may have protruding stops 36 at its rearward corners to position the spherical object for proper engagement by the loading shelf 30. As shown in Figure 3, the base 10 also supports a conventional pneumatic indicating device 40 having three glass indicator tubes 41, 42, and 43, each being provided with an indicator float 44 and with inlet and outlet control valves 45 and 46. Control buttons 47 are also mounted on the base 10 for causing vertical movement of the shelf 30 by electro-hydraulic or other conventional mechanisms not shown.

Referring now to Figure 4, the horn 11 is rotatably supported by the base 10 on a flanged ring 50, ball bearings 51 being provided to allow the horn 11 to be indexed manually. A suitable scale 52 from zero to three hundred and sixty degrees may be inscribed on the periphery of the base of horn 11, and a suitable pointer 53 or similar marker is mounted on base 10. The supporting members 18 and 19 extend upward through the horn 11 as projections from the member 54, the latter being flanged at 55 for rigid attachment to the base 10. The pin 17 is secured in the members 18 and 19 with the axis of the pin 17 horizontal and with its center spaced from the supporting surface 56 of the horn 11 a distance substantially equal to the radius of the object 12 to be gaged. The arm 16 supporting the feeler 15 may be made in two parts as illustrated in Figure 4 to permit sections of different effective length to be substituted when it is desired to gage spherical objects of different radii. Likewise arms 21 of different effective radius may be substituted for the arm 21 shown in Figure 1. The arm 16 is provided with a hub 60 secured to or integral with the sprocket 61 journaled on the pin 17 between spacers 62. A driving chain 63 engages the sprocket 61 and passes through an opening in member 54 to a sprocket 64 on the control shaft 65. The forward end of shaft 65 is connected to the control crank 27. The shaft 65 extends rearward from the sprocket 64 to a clutch 66, and a further shaft 67 extends rearward from the clutch 66 to another sprocket connected by another chain to a sprocket on the pin 22 within the standard 23. The clutch 66 is connected by any suitable linkage represented by the dotted line 68 extending to the clutch control lever 28 at the front of the apparatus. Disengagement of the clutch 66 permits the arm 21 to swing to a horizontal position to the left of pin 17 with the feeler 20 and the axes of pins 22 and 17 being then in a horizontal plane. The shaft 67 for turning the arm 21 may be provided with a locking device 69 connected by any suitable linkage represented by the dotted line 70 extending to the lock control lever 29. The locking device 69 is effective to lock the arm 21 in the horizontal position when lock lever 29 is operated.

The feeler devices 15 and 20 may be of the pneumatic type illustrated in Figure 5 wherein a member 75 is slidably mounted in a bushing 76 carried by a housing 77. A hemispherical work-contacting member 78 is supported on a head 79 secured to the outer end of member 75. Outward movement of the member 75 is limited by a collar 80 carried by the member 75 for engagement with the inner end of mounting bushing 76. A coil spring 81 is provided between the housing 77 and the collar 80 to bias the member 75 to the position illustrated in Figure 5. The inner end of member 75 is tapered as shown at 82 and forms with the tubular bushing 83 an annular orifice for the escape of compressed air delivered to the feeler device by the conduit 85. The conduit 85 is connected to the housing 77 by a clamp ring 86. An outlet opening 87 is provided in the housing 77 for the escape of air which flows through the annular orifice, and the size of the orifice is controlled by the position of the member 75 and its tapered end 82 with respect to the tubular bushing 83. An adjustable clamp 88 is provided for securing a feeler device to the end arm 16 and a similar feeler device to the end of arm 21. The pneumatic feeler device shown in Figure 5 may be of the character described and illustrated in my Patent 2,691,827, issued October 19, 1954, entitled, Adjustable Orifice Unit.

The feeler devices 15 and 20 are each connected by flexible conduits 85 to a control valve 90 and also to a source of air under pressure through a pressure regulator 91. The control valve 90 may be of any suitable type for connecting the conduit from one feeler device 15 to the flow indicator tube 43, the conduit from the other feeler device 20 to the flow indicator tube 42, and for connecting when desired the conduits from both feeler devices to the third indicator tube 41 as desired. Suitable electrically controlled mechanism, not shown, is provided to raise and lower the tube 31 supporting the object loading shelf 30, and is operated by the pushbuttons 47 for up, down, and off-on operation.

The operation of the gaging apparatus illustrated will now be described. The positions of the feeler devices may be adjusted and properly set in the ends of arms 16 and 21 by means of a master tool temporarily supported on the projecting end of pin 17. By this adjustment the contact heads 78 of the feeler devices are positioned a known or desired distance from the coincident axes of pin 17 and support 22. The arm 21 is swung to the left horizontal position and locked in that position by control lever 29. The clutch 66 is disengaged by control lever 28 and the arm 16 is swung to the right and downward by crank 27 until it passes through the notch 93 in the top of horn 11 and is between the support members 17 and 18. With the loading shelf in its lowered forward position, as shown in Figure 1, a spherical object 12 to be gaged is placed on the plate 35 and moved back against the stops 36. Pushbuttons 47 are then operated to start a pump which supplies hydraulic pressure to raise the tube 31 and operation of the up pushbutton causes the tube 31 to rise vertically upward in supporting bearing 32, thereby raising the shelf 30 with an object 12 supported thereon. After the shelf 30 is fully raised, it is swung manually to the left until the object 12 is vertically above the horn 11. Suitable interconnections may be provided to prevent movement of the shelf 30 over the horn 11 unless the feeler 20 is locked in the left horizontal position and the feeler 15 is lowered between members 18 and 19. The down pushbutton is then operated to lower the tube 31 and shelf 30 until the rim of an opening or aperture in the object 12 engages the annular supporting surface 56 on the upper end of horn 11. The shelf 30 is lowered further so that the object 12 is left centered and supported on the horn 11. The crank 27 is then operated to swing the arm 16 counterclockwise until the axis of the inside feeler device 15 is in radial alignment with the axis of the outside feeler device 20. The position lock 29 for the outer arm 21 is then released, and the clutch 66 is engaged by operation of lever 28 so that subsequent movement of the crank 27 moves both arms 16 and 21 in unison in an arcuate path around the horizontal axis of pin 17 and support 22.

Air flow under a regulated pressure of the order of thirty pounds per square inch is delivered by the regulator 91 to each of the flexible conduits 85 leading to the feeler devices 15 and 20. As the contact surface 78 of each feeler device engages the surface of the object being gaged, the tapered portion 82 of the feeler device will be moved into the bushing 83 against the pressure of spring 81 and will vary the orifice and the escape of air pressure through the vent 87. The resulting reduced air pressure is communicated through the valve 90 to a sight tube of the indicator 40. The valve 90 may be set so that feeler device 15 is connected to sight tube 43 and feeler device 20 is connected to sight tube 42. A floating indicator 44 in each sight tube rises or falls in response to variations in the air flow controlled by the position and movement of the feeler device contact heads 78. Adjustable inlet and outlet valves 45 and 46 for each sight tube may be adjusted manually to cause the indicator float 44 to remain opposite a central scale mark on the face of indicator 40 for a given position of the feeler device. The arms 16 and 21 are then swung in unison around the surfaces of the object 12, and any variation in the inside and outside radii will be indicated by movement of the respective floating indicators 44 in the sight tubes 43 and 42. Scale markings on the indicator 40 may be calibrated to indicate radii and thickness, or may be calibrated to indicate maximum and minimum tolerances. After the object 12 has been so gaged in one plane, the horn 11 may be indexed by rotation on the bearing 51 to a new angular position in which the feeler devices may be swung in unison through an arc to gage the object inside and outside radii in aonther plane. It will thus be apparent that the entire inside and outside surface of the object 12 may be accurately gaged and variations in inside and outside radii will be indicated on the respective indicators 42 and 43.

When it is desired to gage the thickness of the spherical shell and variations in said thickness, the valve 90 is operated to connect the conduits 85 from both feeler devices, together and to indicator tube 41. Since the contact heads 78 are maintained in opposed radial alignment with one another as they are swung over the surfaces of the object 12, variations in the thickness of the object 12 will produce an increase in the combined air flow when the thickness increases, and will produce a decrease in the combined air flow when the thickness decreases. The resulting combined pressures will be an accurate gage of wall thickness regardless of any variation in inside or outside radii of the object. The thickness and variations therein may be read by examination of the position of the indicator float in glass tube 41.

After an object 12 has been gaged for variations in inside radius, outside radius, and wall thickness, the arm 21 is swung to the left horizontal position and locked there by lever 29, clutch 66 is disengaged by lever 28 and arm 16 is swung downward through the notch 93 to a position between the supports 17 and 18. The shelf 30 is then raised to lift the object 12 from the horn 11 and swung and again lowered to deposit the gaged object on the plate 35 for removal.

It is to be understood that horn 11, and arms 16 and 21 may be made in different sizes to permit the gaging of objects of different radii. It will also be apparent that the shape of the object supporting horn may be varied for supporting hollow objects of hemispherical or other shapes having a portion of their surfaces of curved or spherical contour. The members 18 and 19 and internal arm 16 may be completely removed when it is desired to gage the radius of a solid object of spherical contour by means of the outside feeler device 20 alone.

While the form of apparatus herein described constitutes a preferred embodiment of the invention, it is to be understood that the invention is not limited to the precise form of apparatus, and that changes may be made therein without departing from the scope of the invention which is defined in the appended claims.

What is claimed is:

1. An apparatus for gaging a substantially spherical hollow object, said apparatus comprising a rotatable support for said object, a feeler device for engagement with the outer spherical surface of said object, a pivotally mounted supporting arm for said device, a second feeler device for engagement with the inner spherical surface of said object, a pivotally mounted supporting arm within said object and for said second feeler device, the pivotal axes of said two arms being coincident and intersecting the center of curvature of said object surfaces, means connecting said supporting arms to swing said supporting arms in unison to move both said feeler devices across the surfaces of said object, and indicating means connected with said feeler devices for indicating variations in the wall thickness of the spherical surface of said hollow object.

2. An apparatus for gaging wall thickness and radii of a substantially spherical hollow object, said apparatus comprising means supporting said object for rotation about an axis coinciding with an object diameter, a feeler device for engagement with the outer spherical surface of said object, a pivotally mounted supporting arm for said device, a second feeler device for engagement with the inner spherical surface of said object, a pivotally mounted supporting arm within said object and for said second feeler device, the pivotal axes of said two arms being coincident, perpendicular to the axis of rotation of the object and intersecting the center of curvature of said spherical surfaces of said object, linkage connecting said supporting arms for swinging both said arms in unison, the axes of both said feeler devices being coincident and intersecting the pivotal axes of said two arms at the center of curvature of said spherical surfaces, whereby the feelers are carried in opposed relationship along an arc of a great circle of the object, and indicating means connected to said feeler devices for indicating variations in wall thickness and inner and outer radii of said hollow object.

3. An apparatus for gaging both wall thickness and radii of a curved hollow object, said apparatus comprising a rotatable support for said object, a pneumatic feeler device for engagement with the outer curved surface of said object, a pivotally mounted supporting arm for said pneumatic feeler device, a second pneumatic feeler device for engagement with the inner curved surface of said object, a pivotally mounted supporting arm for said second pneumatic feeler device, the pivotal axes of said two arms being coincident and intersecting the center of curvature of said curved surfaces of said object, linkage connecting said supporting arms one to the other for swinging said arms and feeler devises in unison, the axes of said feeler devises being coincident, lying along a radius of the object and intersecting the pivotal axes of said supporting arms, whereby they are carried in opposed relationship along an arc of a great circle of the object indicating means including three indicator devices, and conduits connecting said first feeler device to one indicator device, connecting said second feeler device to another of said indicator devices, and connecting both of said feeler devices together to the third of said indicator devices.

4. An apparatus for gaging a substantially spherical hollow object having an aperture therein, said apparatus comprising an upstanding rotatable support, a feeler device for engagement with the outer spherical surface of an object on said support, a pivotally mounted supporting arm for said device, a second feeler device for engagement with the inner spherical surface of said object, a pivotally mounted supporting arm for said second feeler device, a pivot for said second supporting arm mounted above said upstanding object support, the pivotal axes of said two supporting arms being coincident and intersecting the center of curvature of said spherical object when supported on said upstanding rotatable support, loading means engageable with said spherical object and moveable vertically to lower said object onto said upstanding rotatable support for gaging and to lift said object upwardly from said support, and indicating means connected with said feeler devices for indicating variations in wall thickness and in the inner and outer radii of said object.

5. An apparatus for gaging a hollow object forming the major portion of a sphere comprising a support for said object, opposed gage heads for association respectively with inner and outer surfaces of the object, support means for each of said gage heads carrying the respective heads for swinging movement in a plane including the center of curvature of the object and about a common axis coinciding with a diameter of the object, the gaging axis of each head being coincident with a radius of the object, drive means operatively connected to both said support means, said drive means including a connection releasable to allow relative movement of the gage heads to positions for loading of an object to be gaged and engagable for simultaneous swinging of the gage heads while in opposed alignment for gaging, and indicating means connected to both said gage heads and controlled thereby.

6. An apparatus for gaging substantially concentric inner and outer surfaces of a part spherical hollow object, said apparatus comprising a rotatable support for said object, a feeler device for engagement with the outer spherical surface of said object, a supporting arm for said device, a second feeler device for engagement with the inner spherical surface of said object, a supporting arm within said object and for said second feeler device, means on said base pivotally mounting said two arms for swinging movement about coincident axes intersecting the center of curvature of said object surface, means connecting said supporting arms to swing said supporting arms in unison to move both said feeler devices across the surfaces of said object, and indicating means connected with said feeler devices for indicating variations in the wall thickness of the spherical surface of said hollow object.

7. An apparatus for simultaneously gaging substantially concentric inner and outer part spherical surfaces of an object, said apparatus comprising a base, a rotatable support on said base for said object, a feeler device for engagement with the outer spherical surface of said object, a supporting arm for said device, a second feeler device for engagement with the inner spherical surface of said object, a supporting arm for said second feeler device, means on said base mounting said arms for pivotal movement about coincident axes intersecting the center of curvature of said object surface, said arms carrying said feeler devices for swinging movement in a common plane intersecting the center of curvature of the surfaces while in engagement with the respective surfaces at points on a common line radial to the center of curvature during gaging, means connected to swing said supporting arms and move both said feeler devices across the inner and outer surfaces of the object, and indicating means connected with both said feeler devices for indicating variations in the wall thickness of the spherical surface of said hollow object.

8. An apparatus for simultaneously gaging substantially concentric inner and outer surfaces of a part spherical object, said apparatus comprising a base, support means on said base for carrying an object to be gaged, a first feeler device for engagement with the outer spherical surface of said object, a supporting arm for said device, a second feeler device for engagement with the inner spherical surface of said object, a supporting arm for said second feeler device, a pivot support on said base carrying both said arms for swinging movement about coincident axes intersecting the center of curvature of the object surfaces, said arms carrying said feeler devices in opposition and for movement along a line of great circle curvature of the object during gaging, means connected to swing said arms in unison to move both said feeler devices across the surfaces of said object, said part and said pivotal support being carried on said base for relative rotation about an axis perpendicular to said coincident axes and lying in the plane of feeler movement to vary the plane of gaging for a full study of the object surfaces, and gaging means operatively connected to both said feeler devices for measuring dimensional characteristics of said surfaces.

9. An apparatus for simultaneously gaging substantially concentric inner and outer part spherical surfaces of an object, said apparatus comprising a base, carrying means on said base for an object to be gaged, a first feeler device for engagement with the outer spherical surface of said object, a supporting arm for said device, a second feeler device for engagement with the inner spherical surface of said object, a supporting arm for said second feeler device, pivot support means on said base carrying both said arms for swinging movement about coincident axes intersecting the center of curvature of the object surfaces, means connected to swing said arms in unison to move both said feeler devices across the surfaces of said object, means mounting said carrying means and said pivot support means on said base for relative adjustment to vary the plane of gaging for a full study of the object surfaces, first indicating means responsive to said first feeler device in accordance with dimensional characteristics of the outer spherical surface of said object, second indicating means responsive to said second feeler device in accordance with dimensional characteristics of the inner spherical surface of said object, and third indicating means responsive to both said feeler devices in accordance with the object thickness.

10. An apparatus for gaging inner and outer substantially concentrically curved surfaces of an object, said apparatus comprising a base, a support on said base for said object, a feeler device for engagement with the outer curved surface of said object, a supporting arm for said device, a second feeler device for engagement with the inner curved surface of said object, a supporting arm for said second feeler device, means on said base pivotally mounting said two arms for swinging movement about coincident axes and about the center of curvature of said object surfaces, means connected to swing said supporting arms in unison to move both said feeler devices in opposition across the surfaces of said object, first indicating means responsive to said first feeler device in accordance with dimensional characteristics of the outer curved surface of the object, second indicating means responsive to said second feeler device in accordance with dimensional characteristics of the inner curved surface of the object, and third indicating means responsive to both said feeler devices in accordance with the object thickness.

11. An apparatus for gaging the curvature of a part spherical surface of an object comprising a base, a support member carried for rotation on said base, said support member having locating means for disposing the center of curvature of an object to be gaged substantially coincident with the axis of rotation of said member, a feeler device including a movable work contactor for engagement with the surface to be gaged, a pivotal support on said base having a pivot axis transverse the axis of rotation of said member and intersecting the center of curvature of the surface to be gaged, an arm on said pivotal support carrying said feeler device for swinging movement about the pivot axis and directing said work contactor substantially radially of an object carried by said support member in gaging position, actuating means for positioning said arm about said pivot axis, and measuring means connected to said feeler device and controlled thereby in accordance with movements of said work contactor within said device as the feeler device and gaged surface are relatively positioned.

12. An apparatus for gaging the curvature of a convexly curved part spherical surface of an object comprising a base, a support member carried for rotation on said base, said support member having locating means for disposing the center of curvature of an object to be gaged substantially coincident with the axis of rotation of said member, a feeler device including a movable work contactor for engagement with the surface to be gaged, a pivotal support on said base having a pivot axis transverse the axis of rotation of said member and intersecting the center of curvature of the surface to be gaged, an arm on said pivotal support carrying said feeler device at the exterior of the object surface for swinging movement about the pivot axis and directing said work contactor radially inward toward the pivot axis and substantially radially of an object carried by said support member in gaging position, actuating means for positioning said arm about said pivot axis, and measuring means located remotely of said feeler device and against movement therewith connected to said feeler device and controlled thereby in accordance with movements of said work contactor within said device as the feeler device and gaged surface are relatively positioned.

13. An apparatus for gaging the curvature of a spherically curved surface of a part comprising a base, a support member for carrying an object to be gaged, bearing means cooperating between said member and said base supporting said member for rotation about a vertical axis, locating means on said member for disposing an object carried thereby with the center of curvature of the surface to be gaged substantially coincident with said vertical axis, a feeler device having a movable work contactor, a pivotal support on said base having a horizontal pivot axis intersecting the axis of rotation of said support member at the disposition of the center of curvature of the surface to be gaged, a sweep arm on said pivotal support carrying said feeler device for movement in a great circle plane of the gaged surface, actuating means connected to swing said arm and position said feeler device at any desired angle of elevation in the gaging plane during a gaging operation, and gaging means supported against swinging movement with said feeler device and connected thereto for response to gaging movements of said work contactor.

14. An apparatus for simultaneously gaging substantially concentric inner and outer part spherical surfaces of an object, said apparatus comprising a base, support means on said base for said object, a feeler device for engagement with the outer spherical surface of said object, a supporting arm for said device, a second feeler device for engagement with the inner spherical surface of said object, a supporting arm for said second feeler device, support means on said base for said arms carrying said feeler devices in opposed facing relationship along a line of gaging, said support means including means carrying said object and said arms for relative pivotal movement about an axis intersecting the center of curvature of said object surface, said arms carrying said feeler devices in a common plane intersecting the center of curvature of the surfaces while in engagement with the respective surfaces at points on a common line radial to the center of curvature during gaging, whereby said feeler devices are moved relative to the inner and outer surfaces of the object, along a great circle of curvature upon relative pivoting about said axis, and indicating means connected with both said feeler devices for indicating variations in the wall thickness of the spherical surface of said hollow object.

15. An apparatus for simultaneously gaging substantially concentric inner and outer part spherical surfaces of an object, said apparatus comprising, first support means for said object, a feeler device for engagement with the outer spherical surface of said object, a second feeler device for engagement with the inner spherical surface of said object, second support means carrying said feeler devices in opposed facing relationship along a line of gaging, a base mounting said first and second support means for relative pivotal movement about an axis intersecting the center of curvature of said object surface and transverse the line of gaging, said second support means carrying said feeler devices in a common plane intersecting the center of curvature of the surfaces and in engagement with the respective surfaces at points on a common line radial to the center of curvature during gaging, means connected to relatively pivot said first and second support means about said axis for relative movement between said feeler devices and the inner and outer surfaces of the object in the gaging plane, and indicating means connected with both said feeler devices for indicating variations in the wall thickness of the spherical surface of said hollow object.

16. An apparatus for simultaneously gaging substantially concentric inner and outer surfaces of a part spherical object, said apparatus comprising first support means for carrying an object to be gaged, a first feeler device for engagement with the outer spherical surface of said object, a second feeler device for engagement with the inner spherical surface of said object, second support means carrying said feeler devices in opposed facing relationship along a line of gaging, a base carrying said first and second support means for relative pivoting movement about an axis intersecting the center of curvature of the object surfaces and transverse the line of gaging, said second support means carrying said feeler devices for movement relative to the surfaces of the object along a line of great circle curvature of the object during relative pivoting of said support means on said base, one of said support means being carried on said base for rotation relative to the other about an axis perpendicular to said pivoting axis and lying in the plane of feeler movement to vary the plane of gaging for a full study of the object surfaces, and gaging means operatively connected to both said feeler devices for measuring dimensional characteristics of said surfaces.

References Cited in the file of this patent

UNITED STATES PATENTS

| | | |
|---|---|---|
| 2,123,355 | Feehrer et al. | July 12, 1938 |
| 2,310,925 | Bardwell | Feb. 16, 1943 |
| 2,387,852 | Maloff | Oct. 30, 1945 |
| 2,438,274 | Eisele | Mar. 23, 1948 |
| 2,574,342 | Mennesson | Nov. 6, 1951 |
| 2,599,835 | Johnson et al. | June 10, 1952 |
| 2,621,416 | Brenneke | Dec. 16, 1952 |

FOREIGN PATENTS

| | | |
|---|---|---|
| 549,737 | Great Britain | Dec. 4, 1942 |